(12) United States Patent
Barrett-Lennard et al.

(10) Patent No.: US 6,654,048 B1
(45) Date of Patent: Nov. 25, 2003

(54) CALIBRATION OF IMAGING SYSTEMS

(75) Inventors: David Barrett-Lennard, West Perth (AU); Lachlan Partington, West Perth (AU); Emlyn Garvey, Beenleigh (AU); Kurt Malmstrom, Beenleigh (AU)

(73) Assignee: Meat & Livestock Australia Limited, North Sydney (AU)

( * ) Notice: Subject to any disclaimer, the term of this patent is extended or adjusted under 35 U.S.C. 154(b) by 0 days.

(21) Appl. No.: 09/380,027

(22) PCT Filed: Mar. 3, 1998

(86) PCT No.: PCT/AU98/00135

§ 371 (c)(1),
(2), (4) Date: Nov. 8, 1999

(87) PCT Pub. No.: WO98/39627

PCT Pub. Date: Sep. 11, 1998

(30) Foreign Application Priority Data

Mar. 3, 1997 (AU) .................................. PO5428

(51) Int. Cl.$^7$ ................................................. H04N 1/56
(52) U.S. Cl. ................. 348/180; 348/135; 348/89; 348/95; 348/188; 382/110; 382/162; 358/504
(58) Field of Search ................................. 348/188, 180, 348/187, 93, 89, 95, 92, 135, 147, 227.1, 223.1, 272; 382/110, 151, 162, 294, 302; 358/504

(56) References Cited

U.S. PATENT DOCUMENTS

| | | | |
|---|---|---|---|
| 4,992,963 A | 2/1991 | Funt et al. | 364/526 |
| 5,043,804 A | 8/1991 | Sugiura | 358/41 |
| 5,452,112 A * | 9/1995 | Wan et al. | 358/406 |
| 5,481,380 A * | 1/1996 | Bestmann | 358/504 |
| 5,485,284 A * | 1/1996 | Shono et al. | 358/504 |
| 5,495,429 A * | 2/1996 | Craven et al. | 382/157 |
| 5,754,682 A * | 5/1998 | Katoh | 348/227.1 |
| 5,793,879 A * | 8/1998 | Benn et al. | 348/89 |
| 5,850,472 A * | 12/1998 | Alston et al. | 382/162 |
| 5,917,541 A * | 6/1999 | Nakagome et al. | 348/187 |
| 6,104,827 A * | 8/2000 | Benn et al. | 382/110 |
| 6,301,396 B1 * | 10/2001 | Michael et al. | 382/151 |
| 6,453,066 B1 * | 9/2002 | Shiraiwa et al. | 382/162 |

FOREIGN PATENT DOCUMENTS

| | | | |
|---|---|---|---|
| EP | 0 624 028 A1 | 11/1994 | H04N/1/46 |
| EP | 0 674 429 A2 | 9/1995 | H04N/1/60 |
| EP | 0 682 236 A1 | 11/1995 | G01J/3/02 |

OTHER PUBLICATIONS

Hung, Po–Chieh: "Colorimetric Calibration for Scanners and Media", SPIE vol. 1448 Camera and Input Scanner Systems (1991); pp. 164–174.

* cited by examiner

Primary Examiner—John Miller
Assistant Examiner—Jean W. Désir
(74) Attorney, Agent, or Firm—Drummond & Duckworth

(57) ABSTRACT

The calibration of an imaging system having a camera (20) for capturing colour data for a target object (carcass 10) includes a primary calibration to obtain a primary transform for RGB data to enable compensation for variations in the camera operation or characteristics, and a secondary calibration obtain a secondary transform to enable compensation for local lighting conditions during capture and processing of colour data for captured images to be analysed. The calculated primary transform relates the actual measured colour data to known standard colour data for the particular standard colour specimens (31). The standard colour specimens (31) are presented in an enclosure or hood (30) to the camera under controlled illumination and with extraneous or external light being excluded from illuminating the specimens. A preliminary calibration includes calibrating the primary calibration standard colour specimens and associated controlled light source against centralised laboratory standard colours.

5 Claims, 2 Drawing Sheets

CALIBRATION OF IMAGING SYSTEMS

This invention relates to the calibration of imaging systems, particularly for systems used for capturing colour information for meat or carcass sections for subsequent analysis.

There have been over recent years attempts to use more objective systems analysing meat sections such as carcasses in an abattoir for the purpose of grading. Attempts have been made to capture by means of colour cameras colour information for automated analysis.

Patent specification No. WO-91/14180 describes in some detail the background of the necessity and known practices to evaluate a carcass in an abattoir e.g. for predicting yield. That specification discloses the capture of an image and colour analysis to discriminate fat, meat, bruised tissue, etc. The specification recommends uniform controlled lighting conditions.

Patent specification WO-92/00523 discloses a carcass grading system using video cameras to capture images. This specification recognises the need for calibration to a defined set of environmental characteristics but merely observes that new parameters are needed if conditions change radically. The specification proposes that it is possible to have a "dynamically self-calibrating" system upon start up, and a system which is "self-compensating in operation" but without describing how.

Patent specification WO-95/21375 discloses a system for assessing meat pieces in an enclosure where there is controlled illumination and a controlled temperature. The system refers to the provision of reflection and colour references to enable adjustment of the system for instability in the camera or in the light sources.

Patent specification No. EP0730146 discloses a system using controlled illumination in which an image of the background is captured and from this an image of a carcass overlying the backgrounds is subtracted. The specification refers to the system being sensitive to camera variation and to the need for controlled illumination and to the consistency of position between the two images. Reference is made to the position of colour pads placed in the field of vision to enable adjustment of the camera, the lamps and/or RGB values.

All of these patent specifications gloss over the provisions for calibration, possibly because it was not recognised how critical calibration might be or alternatively the systems have not been developed sufficiently for the calibration problems to have been seriously addressed and adequate provisions made.

In developing a system to enable reliable prediction of the yield (or other characteristics) of a carcass, we have been attempting to rely on the recognition that colours of the carcass surface (which vary depending on whether there is fat or meat or selvedge exposed) are some of the best predictors of a carcass yield. We have been testing a system which uses the average colour or RGB values from a number of selected sections or "patches" on the surface of a carcass to predict the amount of fat cover automatically and, we have been using empirically obtained data to derive statistical equations relating the measured colour or RGB values to predict yield. Preferably multiple patches at different areas of the carcass are imaged, the selected patches being those which have been determined to have correlations with the actual bone out yield, and the system measures the average colour on each of these patches and these data are combined into the yield prediction equation. Patches with higher correlations with the actual bone out yield can have higher coefficients in the equation than those with a lower correlation. Basically the whiter the colour the more fat that the system infers.

Colour is difficult to measure absolutely. The colour seen by the human eye or by a video camera varies depending on the amount of and the colour of the light reflected from the viewed surface. We have found that whilst the absolute colour is not critical or essential to the successful operation of the yield prediction system, the relativity of the colour is desirably consistent from one plant or abattoir to another. If this is not the case, the system when used in different plants would predict different yields for identical carcasses which, of course, defeats the purpose of attempting to have a computerised or automated grading or classifying system. It follows therefore th at calibration of an imaging system for use in automated analysis of products such as meat carcasses becomes extremely important to provide consistent results in different environments of use.

Ac cordially it is an object of the present invention to provide a method and apparatus for calibration of an imaging system which can ensure or at least promote consistency of operation in different environments .

It is a further preferred object to provide a method and system for imaging having effective calibration provisions for the system to promote consistent results under different operating conditions.

According to a firsts aspect of the present invention there is provided a method for calibration of an imaging system having a camera for capturing colour data for a viewed scene, the method including a primary calibration to enable compensation for variations in the camera operation or characteristics, the primary calibration including providing a number of standard colour specimens and presenting these to the camera under controlled illumination conditions, capturing image data for the standard colours including colour data and calculating a primary transform comprising compensation factors or transformation parameters for relating the actual measured colour data to known standard colour data for the particular standard colour specimens; the method further including a secondary calibration to enable compensation for local lighting conditions during capture and processing of colour data for captured images to be analysed, the secondary calibration process comprising presenting to the camera reference colour specimens exposed to the lighting conditions that the object to be imaged and analysed is being or is to be exposed, followed by capturing image data for the reference colour specimens and determining a secondary transform comprising compensation factors or transformation parameters for relating the measured colour data for the reference colour specimens to known colour data for those specimens.

According to a second aspect of the present invention there is also provided a method for imaging a target object by an imaging system and providing corrected image data for the target object, the method including the steps of: calibrating the imaging system according to the first aspect; capturing image data for the target object; and applying the secondary transform and the primary transform to the image data for the target object so as to yield more objective colour data for the target object.

In use where the target object comprises a carcass to be graded or classified according to colour characteristics, the method of imaging preferably comprises locating the carcass at an image station adjacent to which are provided the reference colour specimens so that the carcass and reference colour specimens are imaged simultaneously under the same lighting conditions during the secondary calibration process.

The present invention also provides apparatus for calibrating an imaging system, the apparatus including means for performing the operations or steps of the method of the invention.

It will be convenient to describe the steps of the method and apparatus in conjunction with each other since separating the descriptions of the method and apparatus will be artificial and may make understanding more difficult. The invention however provides both a method and apparatus.

The primary calibration of present invention enables compensation for characteristics of the camera or cameras used in different environments to ensure a system used in one factory, abattoir, etc will not provide different results to a different camera because of different cam era response characteristics. Preferably, the primary calibration is carried out at the commencement of a sequence of imaging operations by the imaging system of successively presented target objects, the calculated primary transform for relating the actual measured colour data to known standard colour data for the particular standard colour specimens being stored for corrective processing of the colour data subsequently collected for successive target objects to be imaged and analysed.

In an abattoir, the primary calibration may be carried out relatively infrequently e.g. at commencement of daily operations of the system (preferably after the camera and standard light source have been powered up for a substantial time so as to be stabilised, e.g. for at least half an hour, and then possibly only a few more times for the rest of the day).

The secondary calibration i s carried out repeatedly throughout a period of use of the imaging system during which multiple target objects are sequentially presented for capture of image data useable for analysing the target objects, whereby time varying illumination conditions for target objects being sequentially presented can be compensated for in the captured image data for the target objects.

For example, the secondary calibration can be carried out at the time of capture of every image of an object to be analysed. The purpose of such continual calibration is to ensure reliability of image data processing in the presence of short term or intermittent variations in conditions such as ambient light variations due to time of day or due to normal operation of lighting equipment in a functioning abattoir, as well as power supply fluctuations to light sources, temperature variations, passing shadows, etc. The reference colour specimens used in the secondary calibration may comprise for example a display of multiple colour reference specimens presented simultaneously to the camera and being located in proximity to the location of the target object to be imaged and analysed so as to be exposed to substantially the same lighting conditions as the target object.

The secondary calibration process may include locating white reference specimen areas generally in the position that the target object to be imaged will occupy, followed by capturing image data for the white reference specimen areas and determining a spatial light level transform comprising compensating factors or transformation parameters to apply to measured colour data from the target object so as to compensate measured colour data for spatially varying light conditions at the position occupied by the target object. In one possible embodiment there are a number of white reference specimens dispersed over the area and preferably forwardly or in front of the position of the target object to be imaged, these white reference specimens being dispersed over the image area enabling the derivation of compensating factors or transformation parameters for spatially varying light conditions over the image area. In an alternative possible embodiment, wherein the white reference specimen areas are provided by a white board removably positioned at the site to be occupied by the target object to be imaged.

The apparatus of the present invention may provide some means for control of ambient influences, particularly in the case of the primary calibration. For this purpose, the primary calibration may include presenting the standard colour specimens to the camera under controlled illumination and with extraneous or external light being substantially excluded from illuminating the standard colour specimens.

Although the particular described carcass system is designed, constructed and operated to compensate for local ambient lighting variations, nevertheless some degree of ambient light control may be provided. For example, the target object to be imaged and analysed may be moved past screening means to the imaging position which the camera faces, and after imaging the object exits past further screening means. One advantage of this provision of screening means is to reduce the risk of false readings due for example to specular reflections at the target object from extraneous but transient light sources.

The method may further include a preliminary calibration in which the primary calibration standard colour specimens and associated controlled light source are calibrated against centralised standard colours by using the camera to capture image data for the centralised standard colours and determining a preliminary transform comprising compensation factors or transformation parameters for relating the actual measured colour data for the standard colour specimens to known standard colour data for the centralised standard colours. In the preferred embodiment of the process, the primary calibration standard colour specimen arrangement (i.e. the enclosure or hood, specimens and lighting) itself undergoes this preliminary calibration, e.g. in the controlled centralised environment (the "Lab") whereby the primary calibration standard colour specimens and associated controlled light source are calibrated against a centralised or laboratory standard, the calibration data for the primary standard colour specimens and associated light source being stored for use with a particular colour specimen and light source set. In this manner, when the primary standard colour specimen and associated light source set are used in the field, the colour data obtained can be related back to the centralised or laboratory standard, i.e. by the preliminary transform applied to the captured RGB data.

The present invention also provides in a further aspect an imaging system for use in imaging and analysis of a target object, the system including a camera for capturing colour data for the target object; a primary calibration means to enable compensation for variations in the camera operational characteristics, the primary calibration means including a number of standard colour specimens arranged to be presented to the camera under controlled illumination conditions, and means for calculating a primary transform comprising compensation factors or transformation parameters for relating the actual measured colour data provided by the camera to known standard colour data for the particular standard colour specimens; a secondary calibration means to enable compensation for local lighting conditions during capture and processing of colour data for a captured image of the target object, the secondary calibration means including reference colour specimens arranged to be presented to and imaged by the camera in a position so as to be exposed to the lighting conditions that the target object to be imaged and analysed is being or is to be exposed, and means for determining a secondary transform comprising compensation factors or transformation parameters for relating the measured colour data derived from the camera for the reference colour specimens to known colour data for those specimens.

In an imaging system according to the invention the primary calibration means may include an enclosure or hood arranged to be fitted to the camera and having the standard colour specimens therein illuminated by an internal light source, the enclosure shielding the standard colour specimens from external illumination, the primary transform being calculated to transform source colour data provided by the camera (which is located at the site where the target objects will be imaged) with the standard colour specimens being viewed within the enclosure into target colour data which is stored colour data for the standard colour specimens viewed by the same camera within the same enclosure in a controlled environment.

It will be convenient to further describe the method and apparatus of the present invention with particular reference to a system developed for imaging and analysing meat carcasses, particularly for colour analyses of whole carcasses to predict yield. However it will be appreciated that the method and apparatus are applicable to other imaging systems where colour data for imaged target objects are to be analysed and consistency of the analysis results between different imaging systems is desirable.

Possible and preferred features of the present invention will now be described with particular reference to the accompanying drawings. However it is to be understood that the features illustrated in and described with reference to the drawings are not to be construed as limiting on the scope of the invention. In the drawings.

Figure 1:
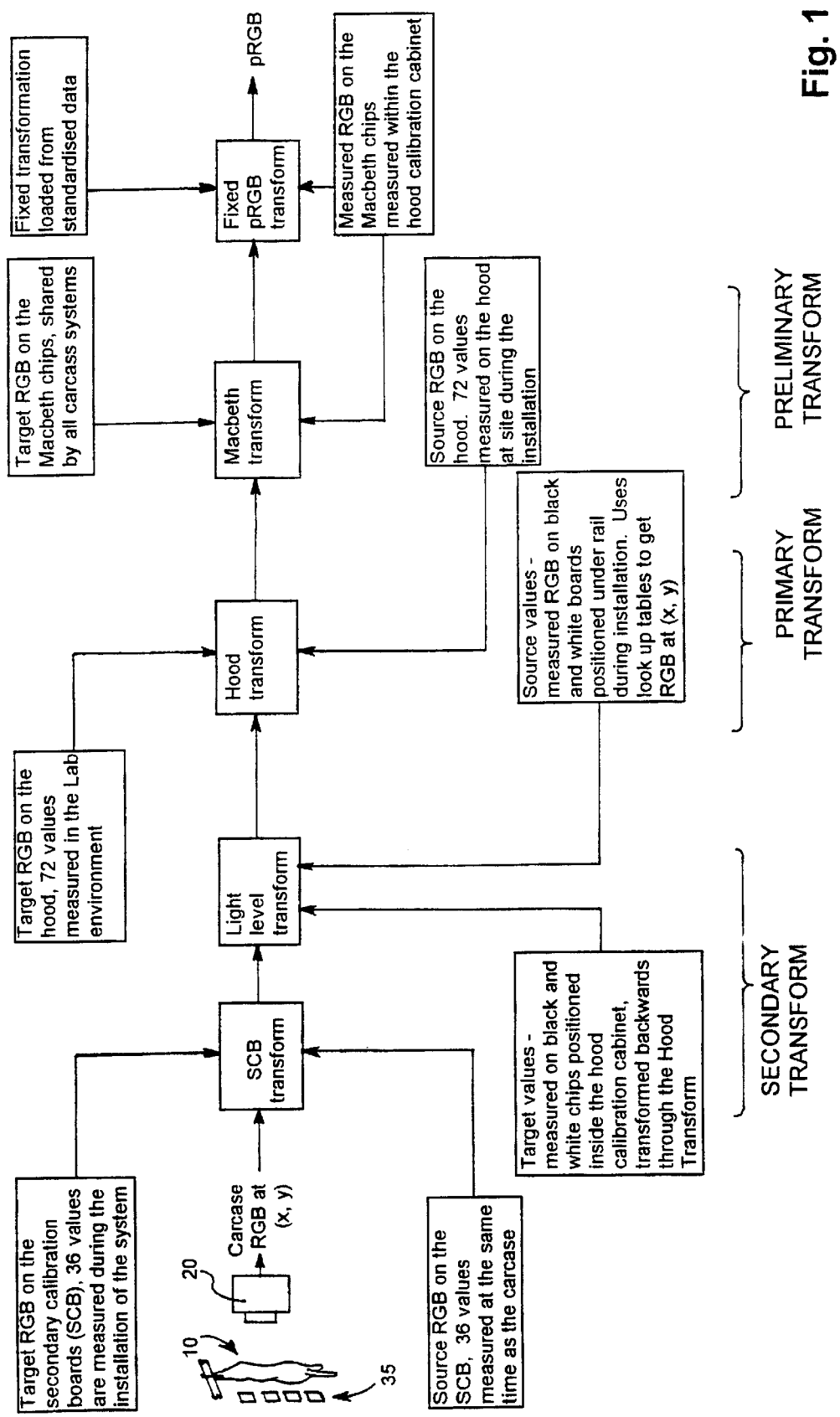
FIG. 1 shows a sequence of transforms derived during calibration of the system and being used to map measured RGB values for a pixel at a given (x,y) position to corrected RGB values useable for analysis purposes.

The system illustrated in the drawings is designed to use colour image processing to measure attributes of beef carcasses. To achieve accuracy and repeatability, the system is calibrated using the colour calibration system outlined in the following sections.

The calibration system includes a number of components used in the various stages of the calibration procedures. These components are:

Reference Camera—a camera (not shown) used to measure standard colour chips 16 to serve as a reference for all other cameras (e.g. 24 standard colour chips known as Macbeth colour chips).

Hood Calibration Cabinet 15—cabinet that contains the same camera as that located on site. The Macbeth colour chips 16 and a Calibration hood 30 are imaged in this cabinet 15 to establish a preliminary transform or mapping between the hood colour chips 31 and the 24 Macbeth colour chips 16.

Calibration Hood 30—hood constructed to fix at the front of the camera to allow repeatable and accurate positioning of 24 colour patches in front of both the cabinet camera 17 and the site camera 20. This hood 30 is used in the derivation of a primary transform to convert measurements from the site camera 20 back to the Macbeth chip reference.

Black and Off-White Chip and Calibration Pole—Large black and white chips positioned under the abattoir carcass rail on which carcasses advance through the abattoir, the chips being provided on a calibration pole during a calibration. These chips are used to provide a reference between the values from the hood and those measured under the rail.

Spatial Lighting Boards—Large black and white two-dimensional boards (not shown) positioned under the rail during a calibration to calculate the spatial lighting distribution on a plane.

Secondary Calibration Boards 35—These boards are permanently fixed in the field of view of the site camera 20 and are used to derive the secondary transform to account for global lighting changes since the time of site calibration.

The calibration components allow a number of transforms to be calculated. These are described next.

TABLE 1

Purpose of the colour calibration transforms

| Transform | Description |
|---|---|
| Secondary Calibration Boards (Secondary Transform) | Accounts for global light level changes on an image by image basis. Maps the measured carcass RGB values to equivalent values that would have been obtained at the time of the primary system calibration. |
| Light level compensation (Spatial Light Level Transform) | Compensates for the variation in light level over a planar board in the field of view. |
| Hood (Primary Transform) | Maps between the site camera and the camera within the hood calibration cabinet. It has been shown that a fairly complex transformation is required to relate one camera to another. A third order transform is used. 24 coloured chips are used to fit the model. |
| Macbeth (Preliminary Transform) | Maps RGB in the hood calibration cabinet to a primary reference Macbeth colour chip standard. |
| Fixed pRGB (TpRGB) | To allow for the yield prediction equation to be used (which is defined in terms of the pR pG pB co-ordinate system), there is a need to convert the Macbeth RGB to pRGB. A third order transformation is used to do this. This is a fixed transformation - in the sense that it will not change each time a Lab or on site calibration is undertaken. |

The colour calibration transforms are established during the system calibration. The various transforms are obtained through the procedures explained in the following sections.

SCB Calibration

Purpose

The SCB (secondary calibration board) consists of an array of 12 monochrome laminate panels 35 permanently fixed in the field of view of the carcass system. In the current configuration only monochrome colours are used. The SCB allows for the colour calibration of the system on an image by image basis during the daily operation of the system. The choice of laminate colours, and the positions where they are fixed are not tightly specified. The SCB is calibrated during the installation of the system.

The SCB is used to model changes to the ambient lighting or the camera. It only accounts for global lighting variations however and does not compensate for localised lighting changes over the field of view.

Mathematical Model

To permit a reliable and robust calibration in such a harsh operating environment as an abattoir, it has been important to limit the complexity of the underlying model for the SCB calibration. Linear polynomials independently fit the red, green and blue channels of the measurements taken on the SCB within a carcass image, to the target SCB values which were the measured during the system installation.

This robust fit models global lighting changes or linear +offset camera changes. If the system has not changed since the primary calibration then the linear polynomials will equate to an identity mapping of the form Y=X, otherwise they indicate offset or gain changes (or both) to each of the R, G and B channels respectively.

The degree of the SCB polynomials can be specified to higher orders in the configuration files if a higher order mapping is required.

Performing an SCB Calibration

During a system calibration, the user is asked to specify the positions of the SCB patches. The RGB values of these windows are then averaged and stored as the reference SCB values. When the system software is run each day, a live image is displayed and the user is prompted to press a key when the SCB is not obstructed. The measurement windows are displayed on the live images and the system takes the SCB RGB measurements. If the measured RGB values are not too small or too large and there is no "drift from master" error, the system will fit the linear polynomials and display a graph of the drift in RGB versus measured RGB. The graph is discussed further below.

The SCB Graph

For the 12 SCB panels the graph will display 12 sets of red, green and blue dots (36 in all). The vertical axis is labelled "dRGB" designating delta (change in) RGB. The vertical scale is in grey levels and depends on the degree of drift (because autoscaling is used). The horizontal axis is labelled "RGB", designating the currently measured RGB values on the SCB and the scale is over the range 0–255 grey levels.

The graph also shows the fitted red, green and blue linear polynomials. For example, the red line is the line of best fit though the red dots. The scatter about the line indicates the accuracy of the SCB calibration. In fact the quoted RMS and MAX errors are calculated from the vertical deviations from the data points to the respective fitted linear polynomials.

If there is a global lighting change, the data points will show a positive or negative linear trend. Usually there is no offset—ie the black SCB panels hardly change, so the R, G and B are close to zero at R=G=B=.

The graph can indicate the presence of nonlinearity. This may lead to large errors when a large global lighting change occurs.

It is important for an operator to note the vertical scale of the graph before interpreting the graph. For example, when there is almost no drift the vertical scale is small and the graph shows a wide scatter of points, which is merely camera noise.

Accounting for the Fight Level Under the Rail

To compensate for the light level under the rail, full sized black and white calibration boards can be imaged. This cannot be done during the operation of the system so it is assumed that the lighting distribution does not change with time so it is allowable to account for the light level once during the installation.

After the application of SCB Transform (the secondary Transform) to the RGB measurements on the carcass, it can be assumed that the carcass was in fact imaged at the same time as the primary calibration. These RGB measurements are then compensated for the light level under the rail. To perform this lighting compensation, the black and white calibration boards are placed under the rail and the RGB values over the boards stored. To reference the measured values to the boards imaged in the hood calibration cabinet 15, the values of the black and white reference chips are mapped backwards through the Hood Transform (the Primary Transform).

The Light Level Transform

The Light Level Transform is a model that is fitted using source and target RGB values. The source values come from the look up tables for the full sized black and white spatial calibration boards imaged during the installation, and are therefore a function of position (x,y). The target values are provided by the black and white reference chips after being passed backwards through the Hood Transform.

The model for the Light Level Transform comprises independent red, green and blue first order (ie linear) polynomials. Therefore the model fits exactly through the two given data points. Let Table 2 define the various quantities relevant to the red channel:

TABLE 2

Various quantities relevant to the red channel for defining the equation to correct for light level under the rail.

| | |
|---|---|
| RBT | Target R on black laminate material |
| RWT | Target R on white laminate material |
| RBS(x,y) | Source R on black laminate material at (x,y) |
| RWS(x,y) | Source R on white laminate material at (x,y) |
| RS(x,y) | Uncompensated R on carcase at (x,y) |
| RT(x,y) | Compensated R on carcase at (x,y) - to be found |

Then: $RT(x,y)=RBT+[(RWT-RBT)(RS(x,y)-RBS(x,y))/(RWS(x,y)-RBS(x,y))]$

GT(x,y) and BT(x,y) are determined in a similar fashion.

Measuring RGB on the Standard Colour Specimens in the Hood

To measure the values of the standard colour specimens such as laminate colour chips contained in the calibration hood, the software positions 24 measurement windows on the array of laminate chips. The RGB values within each window are measured and averaged both over the window and temporally over 30 images. These values are then used to establish the Hood Transform comprising a mapping between the hood laminate chips and the Macbeth chips. The Macbeth chip imaging procedure is discussed in the next section.

A red filter is fitted on the site camera to help match the colour temperature of the system's metal halide lights (~5200°K) with the lights in the hood and cabinet (~3200°K). This filter needs to be removed before imaging the hood on the site camera.

Calibration of the Hood With the Macbeth Chips

The hood itself needs to be calibrated (because it is only a secondary reference). This is achieved in the lab environment with the Macbeth chips 16 and the hood calibration cabinet 15. The result is a set of target RGB values stored in the system configuration files.

After this procedure is completed, the calibrated hood 30 can be taken out to site with needed data stored in a computer disk to allow for the installation of a carcass system.

Requirements for the determination of the Preliminary Transform:
The hood calibration cabinet 15
The hood 30 to be calibrated A blank, formatted computer disk The 24 Macbeth chips 16. These provide the primary centralised standard colour reference for the system Black and grey chips of the same material used to measure the light level under the rail. These are required to relate the light level under the rail to the light level at the position where the Macbeth chips are measured.

Steps for the determination of the Preliminary Transform:

1. Set the system frame grabber offset and gain for the lab computer.
2. Set the aperture and white balance on the camera 17 inside the hood calibration cabinet 15. The #4 Macbeth chip (white) is required.
3. Define a rectangle on a check tag. This is used to measure stability of the hardware during this procedure.
4. Measure RGB on the check tag (a grey reference tag). Drift on the check tag is reported with respect to these values.
5. Measure the black and white chips. To reduce the effects of camera noise, each chip is imaged 30 times and the measurements are averaged. For each chip the average RGB, variation in RGB and drift on the check tag is displayed.
6. Input number of times to measure the Macbeth chips 16.
7. Measure Macbeth chips. To reduce the effects of camera noise, each chip is imaged 30 times and the measurements are averaged. For each chip the software displays the name of the chip, the measured RGB, the check tag drift, and the pixel variation on that chip. Each time a chip is measured the software checks that it is not too close to 0 or 255 (the limits of the grey scale range), and it checks that the colour of all the pixels is similar (ie that the chip is uniform over the measurement rectangle).
8. Display measurements on the chips. For each chip the average and range in RGB is displayed. For example, suppose the chips are measured three times over. Then for chip #1 (the red chip) the average of the three measurements will be displayed, as well as the range of those three measurements. This screen also displays the overall rms variation which is the rms of all the differences to the average—as an estimate of the noise of measurement. It also displays the maximum range—which is over all chips and R,G or B channel.
9. Fit the Macbeth transform. A 3rd order Advanced Colour Calibration Algorithm is used to determine the mathematical transformation parameters to map the set of RGB source values to target values. The target values come from standardised data for the RGB values for the Macbeth clips to be used for all carcass systems. The source values are the measurements that have just been taken.
10. Display results
11. Input number of times to measure test chips
12. Measure the test chips
13. Display results
14. Position the hood 30 on the camera 17 inside the hood calibration cabinet 15.
15. Define the measurement windows on the hood. This may require the user to individually define 4 sided polygons on all 24 standard colour specimens 31 or chips (a rather time consuming exercise). Often however, the current set of measurement windows are OK, or else the four corners simply need to be redefined with the mouse.
16. The system then displays an error bar that must be zero'd by the user by adjusting the camera aperture. The error bar is zero'd when the maximum of R,G and B over all 24 chips is within 4 grey levels of the target of 220. These settings are hard-coded and cannot be changed through the menu system.
17. Measure the hood. To reduce the effects of camera noise, each chip 31 is imaged 30 times and the measurements are averaged. These values become the target RGB for fitting the Hood Transform when the hood is taken out to site.

Important data can be stored to the computer disk for use with the hood on site:

Hood target RGB data

Black chip RGB measured in the cabinet

White chip RGB measured in the cabinet

Macbeth chip RGB: source and target values

Macbeth Transform

Test chip data for Macbeth calibration

Correction of RGB Measurements on the Carcass

Once established, the calibration transforms are applied to each colour pixel measurements (RGB values) of each image in the following manner during the operation of the system.

FIG. 1 shows the following steps applied to the measured red, green, blue values (RGB) of a pixel at a given (x,y) position on a carcass.

1. Measure the raw RGB at position (x,y) in pixel coordinates on the carcass 10.
2. Apply the Secondary Calibration Board Transform (TSCB) to the carcass RGB to account for the daily drift.
3. Fit the Light Level Transform. The target values are calculated during a system installation—the measurements on the black and white chips are mapped backwards through the Hood Transform. The source values come from the spatial look-up tables, indexed at the cell containing (x,y).
4. Apply the Spatial Light Level Transform to account for the spatial light level distribution under the rail.
5. Apply the Hood Transform to map back to RGB values in terms of the hood colour chips 31 and the Macbeth chips 16.
6. Apply the Macbeth Transform to map to the standard reference Macbeth colour chips.
7. Apply a fixed transform to provide pRGB values pRGB rather than RGB values are needed for the current carcass yield equation.

In summary, each of the blocks in FIG. 1 is a transformation, with parameters which need to be determined. The purpose of the calibration of the carcass system is to calculate these parameters.

The hood calibration is used to make the camera at site appear in all respects identical to the camera in the Lab.

The light compensation is used to account for the incident light level. It adjusts the measured RGB to what would have been obtained if the surface of the carcase had appeared inside the hood calibration cabinet at the same place where the standard colour specimens were measured.

There are serious concerns about the accuracy and reliability of the prior known calibration procedures which requires a number colour specimens to be imaged in the actual environment of use of the system. This is due to a number of implicit assumptions which may not be valid:

There is no steam or condensation

The ambient lighting is very stable

The mains supply to the 500 W lights is very stable

Ceiling lights only have very insignificant specular reflections off the calibrations specimens The specimen orientation and positions are sufficiently repeatable.

Being forced to make these assumptions is a concern considering the relatively high order fitting of the third order transformation, which is prone to be sensitive to poor input data. When there were only a small number, e.g. 10 calibration specimens this problem can be greatly aggravated by significant over-fitting.

The hood calibration is regarded as a better alternative to such calibration methods because it does not make any of the above assumptions. However it makes a few assumptions of its own which are testable and controllable:

The relative positions of the internal light and the array of colour chips does not change The hood can be positioned on the camera enclosure sufficiently accurately The array of chips are not too far out of focus There are a number of other distinct advantages to the hood calibration concept:

The hood does not make any assumptions about the camera environment, and so the accuracy and repeatability can be fully tested in the lab environment.

A hood calibration at site can be achieved very simply and very quickly. In particular it may be done daring the production run.

The coloured chips within the hood are very well protected, whereas external calibration specimens are very prone to getting dirty and often need to be cleaned with methylated spirits (which could cause changes in object reflectivity over time).

Figure 3:
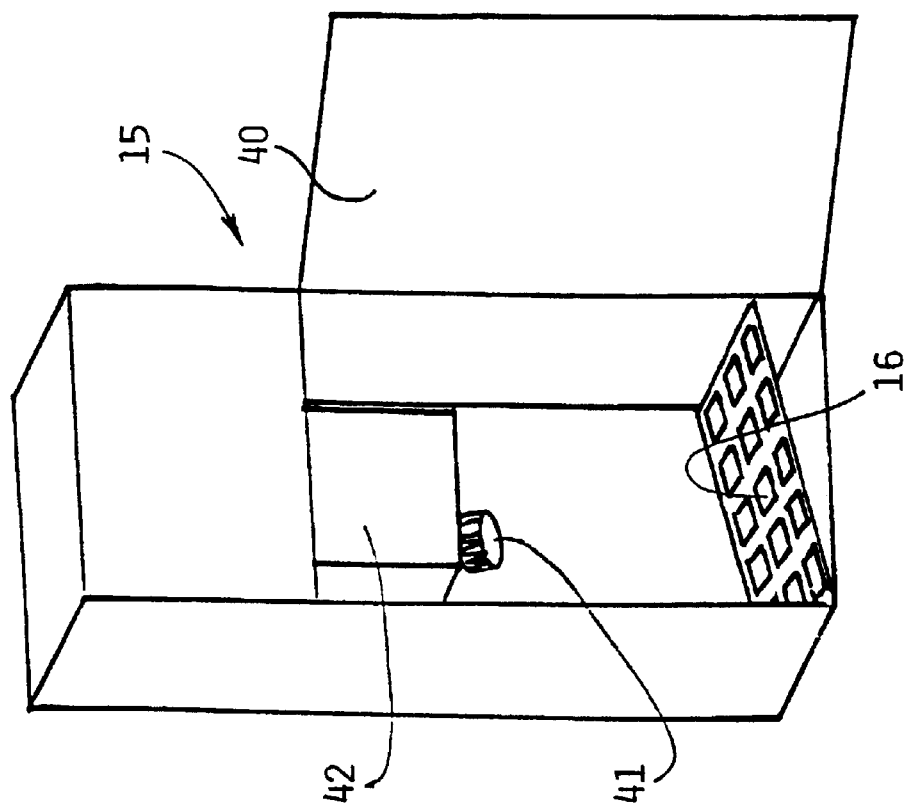
FIG. 3 is a schematic view of a hood calibration cabinet useable in the preliminary calibration.
Figure 2:
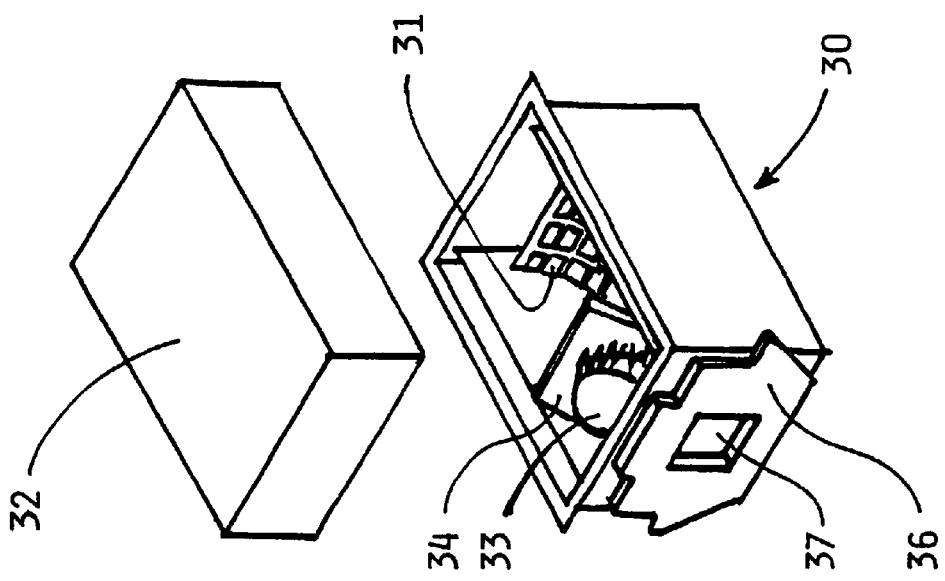
FIG. 2 is a schematic view of an enclosure or hood useable in the primary calibration.

Other components of the hood 30 in FIG. 2 are the lid 32, light source 33 and diffuser 34, camera mounting 36 and aperture 37 for receiving the camera lens. Other components of the hood calibration cabinet 15 in FIG. 3 are the door 40, light source 41 and box 42 for receiving camera 17.

It will be seen that the method and apparatus of the present invention enable accurate, repeatable and consistent analyses of images by systems at different locations due to the effective calibration procedures and apparatus.

Possible and preferred features of an embodiment of the present invention have been described herein. However it is to be understood that the features of the method and apparatus particularly described for carcass analysis are not to be construed as limiting on the scope of the invention.

It is to be understood that various alterations, modifications and/or additions may be made to the features of the possible and preferred embodiment(s) of the invention as herein described without departing from the scope of the invention as defined in the claims.

What is claimed is:

1. A method for calibration of an imaging system having a camera for capturing colour data for a viewed scene, the method including a primary calibration to enable compensation for variations in the camera operation or characteristics, the primary calibration including providing a number of standard colour specimens and presenting these to the camera under controlled illumination conditions and with extraneous or external light being substantially excluded from illuminating the standard colour specimens, capturing image data for the standard colours including colour data and calculating a primary transform comprising compensation factors or transformation parameters for relating the actual measured colour data to known standard colour data for the particular standard colour specimens; the method further including a secondary calibration to enable compensation for local lighting conditions during capture and processing of colour data for captured images to be analysed, the secondary calibration process comprising presenting to the camera reference colour specimens exposed to the lighting conditions that the object to be imaged and analysed is being or is to be exposed followed by capturing image data for the reference colour specimens and determining a secondary transform comprising compensation factors or transformation parameters for relating the measured colour data for the reference colour specimens to known colour data for those specimens, the method further including a preliminary calibration in which the primary calibration standard colour specimens and associated controlled light source are calibrated against centralised standard colours by using the camera to capture image data for the centralised standard colours and determining a preliminary transform comprising compensation factors or transformation parameters for relating the actual measured colour data for the standard colour specimens to known standard colour data for the centralised standard colours.

2. A method for calibration of an imaging system having a camera for capturing colour data for a viewed scene, the method including a primary calibration to enable compensation for variations in the camera operation or characteristics, the primary calibration including providing a number of standard colour specimens and presenting these to the camera under controlled illumination conditions, capturing image data for the standard colours including colour data and calculating a primary transform comprising compensation factors or transformation parameters for relating the actual measured colour data to known standard colour data for the particular standard colour specimens; the method further including a secondary calibration to enable compensation for local lighting conditions during capture and processing of colour data for captured images to be analysed, the secondary calibration process comprising presenting to the camera reference colour specimens exposed to the lighting conditions that the object to be imaged and analysed is being or is to be exposed followed by capturing image data for the reference colour specimens and determining a secondary transform comprising compensation factors or transformation parameters for relating the measured colour data for the reference colour specimens to known colour data for those specimens, wherein the secondary calibration is carried out repeatedly throughout a period of use of the imaging system during which multiple target objects are sequentially presented for capture of image data useable for analysing the target objects, whereby time varying illumination conditions for target objects being substantially presented can be compensated for in the captured image data for the target objects.

3. A method as claimed in claim 2 wherein each secondary calibration includes presenting the reference colour specimens to the camera simultaneously with and located in proximity to the each target object to be imaged so as to be exposed to substantially the same lighting conditions as the target object.

4. A method for imaging; target object which comprises an animal carcass to be graded or classified according to colour characteristics and for providing corrected image data for the carcass, the method including the steps of:

calibrating an imaging system having a camera for capturing colour data for a viewed scene, the method including a primary calibration to enable compensation for variations in the camera operation or characteristics, the primary calibration including providing a number of standard colour specimens and presenting these to the camera under controlled illumination conditions, capturing image data for the standard colours including colour data and calculating a primary transform comprising compensation factors or transformation parameters for relating the actual measured colour data to known standard colour data for the particular standard colour specimens: the calibrating method further including a secondary calibration to enable compensation for local lighting conditions during capture and processing of colour data for captured images of the carcasses to be analysed, the secondary calibration process comprising presenting to the camera reference colour specimens exposed to the lighting conditions that the carcasses to be imaged and analysed are being or are to be exposed, followed by capturing image data for the reference colour specimens and determining a secondary transform comprising compensation factors or transformation parameters for relating the measured colour data for the reference colour specimens to known colour data for those specimens, locating the carcass at an image station adjacent to which are provided the reference colour specimens, capturing image data for the carcass at the image station so that the carcass and reference colour specimens are imaged simultaneously under the same lighting conditions during the secondary calibration process, and applying the secondary transform and the primary transform to the image data for the carcass so as to yield more objective colour data for the carcass.

5. An imaging system for use in imaging and analysis of a target object, the system including a camera for capturing colour data for the target object; a primary calibration means to enable compensation for variations in the camera operational characteristics, the primary calibration means including a number of standard colour specimens arranged to be presented to the camera under controlled illumination conditions, and means for calculating a primary transform comprising compensation factors or transformation parameters for relating the actual measured colour data provided by the camera to known standard colour data for the particular standard colour specimens; a secondary calibration means to enable compensation for local lighting conditions during capture and processing of colour data for a captured image of the target object, the secondary calibration means including reference colour specimens arranged to be presented to and imaged by the camera in a position so as to be exposed to the lighting conditions that the target object to be imaged and analysed is being or is to be exposed, and means for determining a secondary transform comprising compensation factors or transformation parameters for relating the measured colour data derived from the camera for the reference colour specimens to known colour data for those specimens, wherein the primary calibration means includes an enclosure arranged to be fitted to the camera and having the standard colour specimens therein illuminated by an internal light source, the enclosure shielding that standard colour specimens from external illumination, the primary transform being calculated to transform source colour data provided by the camera (which is located at the site where the target objects will be imaged) with the standard colour specimens being viewed within the enclosure into target colour data which is stored colour data for the standard colour specimens viewed by the same camera within the same enclosure in a controlled environment.

* * * * *